(12) United States Patent
Shao (10) Patent No.: US 12,313,179 B2
(45) Date of Patent: May 27, 2025

(54) VALVE CORE TRANSMISSION MEMBERS, VALVE CONTROLLERS, AND VALVE CONTROL METHODS THEREOF

(71) Applicant: CHENGDU QINCHUAN IOT TECHNOLOGY CO., LTD., Sichuan (CN)

(72) Inventor: Zehua Shao, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 120 days.

(21) Appl. No.: 18/323,400

(22) Filed: May 24, 2023

(65) Prior Publication Data

US 2023/0296189 A1    Sep. 21, 2023

Related U.S. Application Data

(63) Continuation-in-part of application No. PCT/CN2021/113256, filed on Aug. 18, 2021.

(30) Foreign Application Priority Data

Jun. 24, 2021  (CN) .......................... 202110705988.1

(51) Int. Cl.
*F16K 31/04*        (2006.01)
(52) U.S. Cl.
CPC .................. *F16K 31/043* (2013.01)
(58) Field of Classification Search
None
See application file for complete search history.

(56) References Cited

U.S. PATENT DOCUMENTS

| 4,702,123 A | * | 10/1987 | Hirao | ...................... F16F 9/462 |
| | | | | 192/142 R |
| 5,062,611 A | | 11/1991 | Hatton | |
| 5,988,319 A | * | 11/1999 | Hudson | ................. F16K 31/047 |
| | | | | 251/69 |
| 6,253,732 B1 | * | 7/2001 | Semeyn, Jr. | .......... F02D 11/107 |
| | | | | 123/396 |

(Continued)

FOREIGN PATENT DOCUMENTS

| CN | 2342189 Y | 10/1999 |
| CN | 2603266 Y | 2/2004 |

(Continued)

OTHER PUBLICATIONS

International Search Report in PCT/CN2021/113256 mailed on Mar. 15, 2022, 6 pages.

*Primary Examiner* — Matthew W Jellett
(74) *Attorney, Agent, or Firm* — METIS IP LLC (57) ABSTRACT

The embodiments of the present disclosure provide a valve core transmission member, a valve controller, and a valve control method. The valve core transmission member includes a drive gear and a spindle, wherein the drive gear is configured to drive the spindle to rotate around a spindle axis and the drive gear is an incomplete gear with an effective engagement angle. The drive gear is capable of rotating around the spindle axis relative to the spindle and have a free rotation angle relative to the spindle; and the effective engagement angle of the drive gear is greater than a free rotation angle.

9 Claims, 5 Drawing Sheets

(56) References Cited

U.S. PATENT DOCUMENTS

| | | | | |
|---|---|---|---|---|
| 6,267,352 B1* | 7/2001 | Semeyn, Jr. | ............ | F02D 9/1065 |
| | | | | 251/313 |
| 2004/0103882 A1* | 6/2004 | Kino | ........................ | F16K 1/22 |
| | | | | 123/399 |
| 2009/0108219 A1* | 4/2009 | Schreiner | ............ | F16K 37/0033 |
| | | | | 251/129.1 |

FOREIGN PATENT DOCUMENTS

| | | |
|---|---|---|
| CN | 201014013 Y | 1/2008 |
| CN | 201368249 | 12/2009 |
| CN | 103742704 | 4/2014 |
| CN | 103742705 | 4/2014 |
| CN | 112151335 | 12/2020 |
| CN | 113217698 | 8/2021 |

* cited by examiner

VALVE CORE TRANSMISSION MEMBERS, VALVE CONTROLLERS, AND VALVE CONTROL METHODS THEREOF

CROSS-REFERENCE TO RELATED APPLICATIONS

This application is a continuation-in-part application of International Application No. PCT/CN2021/113256, filed on Aug. 18, 2021, which claims priority to Chinese Patent Application No. 202110705988.1, filed on Jun. 24, 2021, the contents of which are hereby incorporated by reference.

TECHNICAL FIELD

The present disclosure relates to the technical field of fluid control devices, and in particular to valve core transmission member, valve controllers, and valve control methods.

BACKGROUND

A valve component involved in a fluid on-off control and a fluid flow regulation generally includes a valve and a driver connected to a stem of the valve, and a driver powered by electricity generally includes a drive motor and a reducer. With a development of an Internet of Things technology, a corresponding cut-off valve core is generally arranged in an existing intelligent/smart metering device to achieve a remote and automated valve on-off control in a case of, for example, an exhaustion of available amount, a non-normal flow output emergency, a human forced intervention, etc.

Therefore, it is desirable to provide a valve core transmission member controlled electrically, a valve controller, and a valve control method.

SUMMARY

According to one embodiment of the present disclosure, a valve core transmission member is provided, including a drive gear and a spindle, wherein the drive gear is configured to drive the spindle to rotate around an axis of the spindle and the drive gear is an incomplete gear with an effective engagement angle. The drive gear is capable of rotating around the axis of the spindle relative to the spindle and has a free rotation angle relative to the spindle. The effective engagement angle of the drive gear is greater than a free rotation angle In some embodiments, the drive gear is coaxial with the spindle and the spindle is rotatably connected to the drive gear through a shaft hole of the drive gear. The spindle and the drive gear are provided with a rotation constraint body, and rotation constraint bodies are configured to transmit torque between the spindle and the drive gear. The drive gear transmits the torque to the spindle by mutual extrusion of the rotation constraint bodies.

In some embodiments, the rotation constraint body of one of the spindle and the drive gear is a key and the rotation constraint body of the other of the spindle and the drive gear is a key groove. A width of the key groove is greater than a width of the key. A depth of the key groove is smaller than a length of the shaft hole. A groove bottom surface of the key groove is an arcual surface whose axis is coaxial with the axis of the spindle and an end surface of a key free end is an arcual surface whose axis is coaxial with the axis of the spindle. The groove bottom surface abuts the end surface.

In some embodiments, a count of keys and a count of key grooves are multiple. The count of the keys and the count of the key grooves are equal. The key and the key groove form a key engagement working group one after the other. The plurality of key engagement working groups are evenly arranged in a circular shape relative to the axis of the spindle. The plurality of working groups is synchronously engaged or disengaged during a relative rotation of the spindle and the drive gear.

In some embodiments, the rotation constraint body of the spindle is a tab disposed on a side of the spindle and a count of the tab is one or two. When the count of the tab of the spindle is two, the two tabs are located at a same axial position of the spindle and the two tabs are spaced in a circumferential direction of the spindle. When the count of the tab of the spindle are two, the rotation constraint body of the drive gear is the tab disposed on an end surface of the drive gear and the tab of the drive gear contacts the tabs of the spindle during the relative rotation of the spindle and the drive gear. When the count of the tab of the spindle is one, the rotation constraint body of the drive gear is the two tabs disposed on the end surface of the drive gear and the tab of the spindle contacts the tabs of the drive gear during the relative rotation of the spindle and the drive gear.

In some embodiments, the drive gear is coaxial with the spindle and the spindle is in clearance fit with the drive gear through the shaft hole of the drive gear.

In some embodiments, an elastic member is further disposed between the spindle and the drive gear, the drive gear transmits torque to the spindle through the elastic member, and the spindle and the drive gear realize a relative rotation through an elastic deformation of the elastic member.

In some embodiments, the elastic member is a torsion spring sleeved on the spindle, one end of the torsion spring is fixedly connected to the spindle, and the other end of the torsion spring is fixedly connected to the drive gear.

According to one of the embodiments of the present disclosure, a valve controller is provided, including a driving component and the above valve core transmission member, wherein the driving component drives the drive gear to rotate by engaging with a tooth of the drive gear. The driving component drives the spindle to rotate through the drive gear; wherein a rotation of the spindle includes a forward rotation and a reverse rotation.

In some embodiments, the drive gear is in a relatively rotatable mating state with the spindle during a process of tooth engagement reset after the tooth engagement is disengaged between the driving component and the drive gear.

In some embodiments, the drive gear has a plurality of teeth. The driving component and the drive gear have a mating relationship satisfying that: during a process of tooth engagement reset after the tooth engagement is disengaged under any rotation direction of the drive gear, the drive gear is in a relatively rotatable mating state with the spindle when the driving component engages and resets with a first tooth on the drive gear.

In some embodiments, the driving component includes a reduction gear group and the drive gear is configured to engage with a final gear of the reduction gear group.

In some embodiments, an elastic limiting component is further included, being configured to realize tooth engagement reset between the drive gear and the driving component.

In some embodiments, the elastic limiting component includes an elastic limiting body. The elastic limiting body accumulates energy during a rotation of the drive gear and the elastic limiting body drives the drive gear to rotate through rebounding to realize the tooth engagement reset during a process of the tooth engagement reset.

In some embodiments, the elastic limiting body includes at least one of a spring, an elastic rope, or an elastic rod. One end of the elastic rope is connected to the drive gear, the other end of the elastic rope is connected to a housing of the driving component, and the energy is accumulated by the elastic rope being stretched. One end of the spring or the elastic rod is restrained to one of the drive gear and the housing of the driving component, the other end of the spring or the elastic rod is restrained to the other of the drive gear and the housing of the driving component, and the energy is accumulated by elastic deformation of the spring or the elastic rod.

In some embodiments, the elastic limiting component includes an elastic rod. The elastic rod includes a first rod section and a second rod section, one end of the first rod section is fixed to the drive gear, two ends of the first rod section are located at different positions of the drive gear in a radial direction of the drive gear, the other end of the first rod section is connected to the second rod section, and a free end of the second rod section bulges outwardly relative to an end surface of the drive gear. An end plate of a housing of the driving component is further provided with a rotation limiting slot and the second rod section is partially embedded in the rotation limiting slot.

In some embodiments, the drive gear further includes: a slot extending in a radial direction along the drive gear. The first rod section is fixed to one end of the slot close to the spindle. When the first rod section is in a free state, a direction of the first rod section is the same as an extension direction of the slot, and both sides of the first rod section and side walls of the slot have a swing clearance.

In some embodiments, the side walls of the both sides of the slot have a bump located between the two ends of the first rod section. When the first rod section is in the free state, a clearance is provided between the side wall of each side of the first rod section and the free end of the bump of the side.

According to one of the embodiments of the present disclosure, a valve is provided, including a valve core that adjusts an on-state of the valve by being rotated and the valve controller, the valve core is fixed to the spindle acting as a stem of the valve core.

According to one of the embodiments of the present disclosure, a valve control method is provided, the control method is used for the above valve. The valve realizes an on-off control of the by rotating the valve core, the valve core is driven to work by the drive gear driving the stem to rotate, and the drive gear is capable of relatively rotating around an axis of the stem relative to the stem. The control method includes: before the stem performs a reversing rotation, the drive gear relatively rotating around the axis of the stem relative to the stem, and by the relative rotation, the drive gear providing torque to the stem to drive the valve core to rotate when a tooth engagement reset between the drive gear and the driving component configured to drive the drive gear to rotate is realized.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein.

DETAILED DESCRIPTION

To more clearly illustrate the technical schemes of the embodiments of the present disclosure, the accompanying drawings that need to be used in the description of the embodiments would be briefly introduced below. Obviously, the accompanying drawing in the following description is merely some examples or embodiments of the present disclosure, and those skilled in the art can apply the present disclosure to other similar situations according to the drawings without any creative effort. Unless obviously obtained from the context or the context illustrates otherwise, the same numeral in the drawings indicates the same structure or operation.

It will be understood that the terms "system," "device," "unit," and/or "module" used herein are configured to distinguish different components, elements, parts, sections, or assemblies of different levels. However, the terms may be displaced by other expressions if they may achieve the same purpose.

As used in the present disclosure and the appended claims, the singular forms "a," "an," and "the" are intended to include plural referents, unless the content clearly dictates otherwise. Generally, the terms "comprise" and "include" only imply that the clearly identified steps and elements are included, but these steps and elements may not constitute an exclusive list, and the method or device may further include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Valve components may involve fluid on-off control, a fluid flow regulation, etc., and generally may include the valve and a driver connected to a valve stem. A driver powered by electricity generally includes a drive motor and a reducer. In an existing smart/intelligent metering device, a corresponding cut-off valve core is generally arranged to achieve a remote and automated valve on-off control in a case of, for example, an exhaustion of available amount, a non-normal flow output emergency, a human forced intervention, etc. Taking a common water meter valve with an on-off valve core as an example, a controller of the water meter valve is commonly configured to control a motor to drive a valve core spindle to rotate, while a limit switch is arranged to control a rotation angle of the spindle, thereby achieving a control of a working state of the valve. However, in terms of a method for electrically controlling the rotation angle, there are problems of a high controller cost and a relatively complex control logic, and a corresponding controller is also not conducive to a miniaturization design of an overall valve component.

In view of this, there is a need to further optimize a design of a valve component and provide a structure of the valve component with a relatively simple control and conducive to an overall miniaturization of the valve component.

Figure 1:
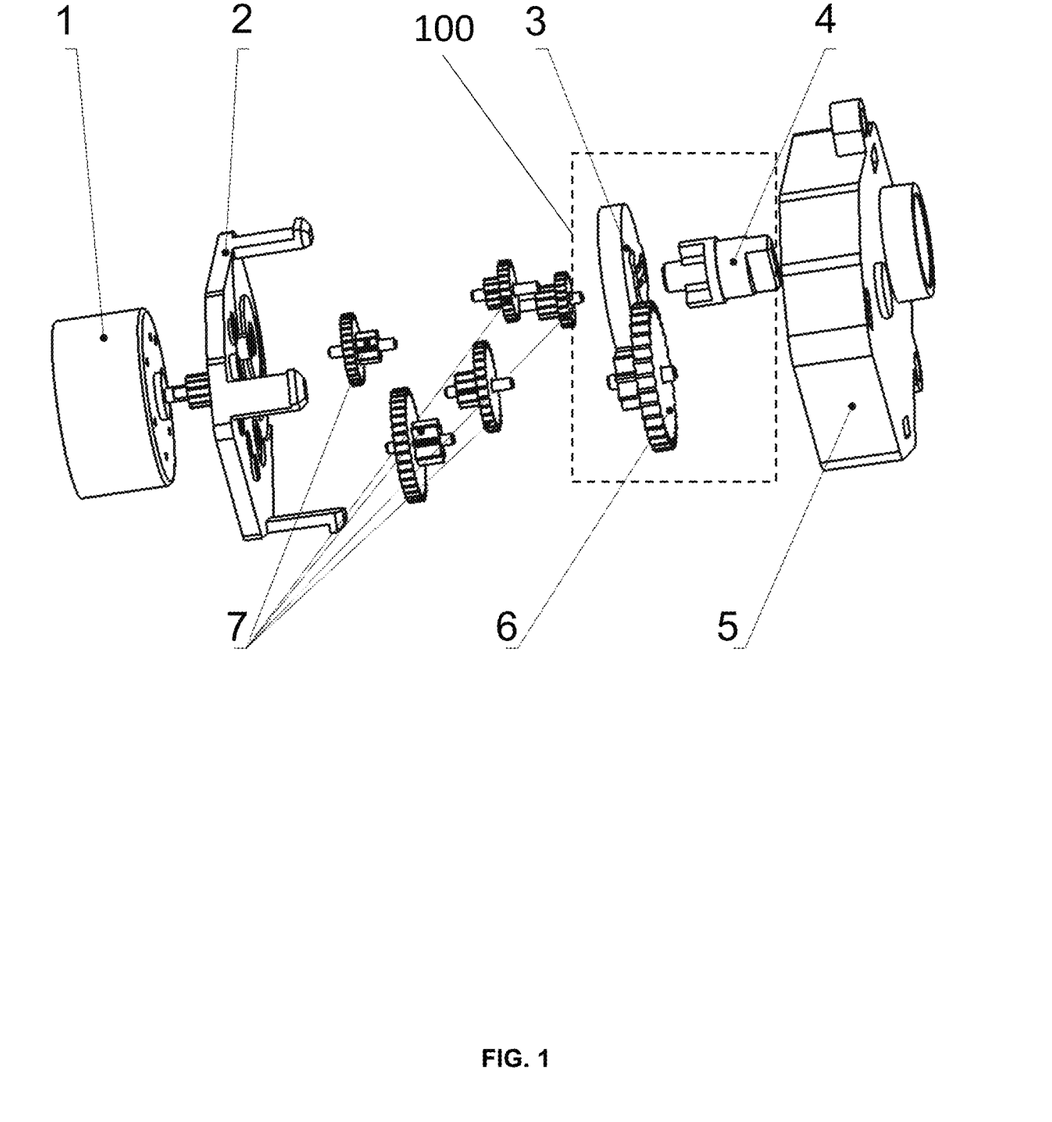
FIG. 1 is an exploded view of a valve controller according to some embodiments of the present disclosure.

FIG. 1 is an exploded view of a valve controller according to some embodiments of the present disclosure.

In some embodiments, as shown in FIG. 1, a valve core transmission member 100 may include a drive gear 3 and a spindle 4, the drive gear 3 is configured to drive the spindle 4 to rotate around an axis of the spindle 4, the drive gear 3 is an incomplete gear, and the drive gear 3 has an effective engagement angle. The drive gear 3 is capable of rotating around the axis of the spindle 4 relative to the spindle 4 and have a free rotation angle relative to the spindle 4. The effective engagement angle of the drive gear 3 is greater than a free rotation angle.

The valve core transmission members 100 may be used as parts of the valve controller, and the valve controller may be configured to drive the valve core to change the on-off state of the valve and an opening situation.

In some embodiments, the valve core transmission member 100 may be used in a small fluid valve that solves a rotor blockage problem through gear transmission. In some embodiments, the drive gear 3 needs to consider a reset power in a subsequent tooth engagement reset after disengaging a tooth engagement state, and a purpose of facilitating further miniaturization design of the valve is reached by reducing a reset power requirement.

In some embodiments, the valve core transmission member 100 and the valve controller are particularly suitable for being controlled by a ball valve, for example, a valve core transmission member 100 and the valve controller for a ball valve, as another example, a part of an Internet of Things water meter valve component. However, the structural design may be not limited to a usage of the ball valve and the water meter valve, but also be applied to other fluid valve assemblies.

The drive gear 3 may refer to a gear for driving the spindle 4 to rotate around the axis of the spindle 4. The drive gear 3 may include a tooth, a tooth groove, an end surface, and other structures. For example, a drive gear 3 may be a cylindrical gear, a bevel gear, a non-circular gear, etc.

In some embodiments, a drive gear 3 may be an incomplete gear, and the drive gear 3 is capable of performing a relative rotation around the axis of the spindle 4 relative to the spindle 4.

In other embodiments, a drive gear 3 may be a complete gear, and the drive gear 3 may be configured as a portion of teeth of the drive gear 3 that engage with the driving component and thereby transmit power. For example, a portion of the teeth of the drive gear 3 of the complete gear may be limited to engage with the driving component by a limiting member.

The spindle 4 may refer to a shaft that receives power from the drive gear 3 as drive of the valve core. In some embodiments, the spindle 4 may be provided with a structure such as a rotation constraint body. In some embodiments, the spindle 4 may be made of plastic, metal, polymer material, etc.

In some embodiments, the spindle 4 is subsequently used as a transmission shaft for drive of the valve core, and the drive gear 3 is configured to drive the spindle 4 to rotate, and the drive gear 3 is capable of rotating around the axis of the spindle 4 relative to the spindle 4.

In some embodiments, a bi-directional rotation of the drive gear 3 (a single rotation in any direction of rotation) is able to act on the valve core to change the on-off state of the valve, and both have a feature of a bi-directional low resistance reset engagement of the drive gear 3 in restoring a tooth engagement of the drive gear 3 with a driving gear of the driving component.

In some embodiments, the drive gear 3 is capable of rotating independently of the spindle 4 by rotating relative to the spindle 4 during a process of tooth engagement reset, and the drive gear 3 is capable of rotating at a greater angle relative to the spindle 4. During a process of the relative rotation of the spindle 4 and the drive gear 3, it is avoided that a rotation resistance of the valve core affect or excessively affect the tooth engagement of the drive gear 3 due to a linkage of the valve core and the spindle 4. Finally, the above operation may improve a reliability of the engagement, reduce a power input required for the tooth engagement reset of the drive gear 3, and realize a purpose of reducing volume of a related structure applied by the idea.

The effective engagement angle may be an angle where the drive gear 3 is capable of rotating under an action of the driving component. For example, if the drive gear 3 is able to rotate at 60° under an action of the driving gear, an effective engagement angle is 60°.

A free rotation angle may be an angle where the drive gear 3 is able to rotate independently of the spindle 4. In some embodiments, the free rotation angle is determined based on the drive gear 3 being able to rotate around the axis of the spindle 4 relative to the spindle 4. Exemplarily, if a drive gear 3 is capable of rotating at 30° independently of the spindle 4, a free rotation angle is 30°.

A rotation angle of the spindle 4 may be an angle where the spindle 4 rotates around the axis of the spindle 4. In some embodiments, the spindle 4 may be configured to control the on-off of the valve, and the rotation angle of spindle 4 may be considered to be a phase difference for controlling the on-off of the valve. Exemplarily, the spindle 4 is capable of rotating at 30° around the axis of the spindle 4, and a rotation angle of the spindle 4 is 30°.

In some embodiments, the effective engagement angle, the free rotation angle, and the rotation angle of the spindle 4 may have the following relationship: effective engagement angle=free rotation angle+rotation angle of the spindle 4. Therefore, based on the above relationship, the effective engagement angle of the drive gear 3 is greater than the free rotation angle, and the effective engagement angle of the drive gear 3 is greater than the rotation angle of the spindle 4.

Exemplarily, no matter which direction the drive gear 3 rotates under the action of the driving component, when the drive gear 3 rotates to a certain position, then it cannot continue to rotate, and the position may be considered as a limit position. Therefore, there are two limit positions in two directions of forward rotation and reverse rotation of the drive gear 3, and a phase difference between these two limit positions is an effective engagement angle. The spindle 4 is capable of rotating at a certain angle under an action of the drive gear 3, which corresponds to a rotation angle of the spindle 4. In some embodiments, the rotation angle of the spindle 4 may drive the valve core to rotate a certain angle, at this time, the rotation angle of the spindle 4 may be considered as a phase difference that controls the on-off of the valve. The free rotation angle is fully covered during a rotation process of the drive gear 3, and the free rotation angle may correspond to an angle where the drive gear 3 is not able to drive the spindle 4 to rotate during the rotation.

Figure 2:
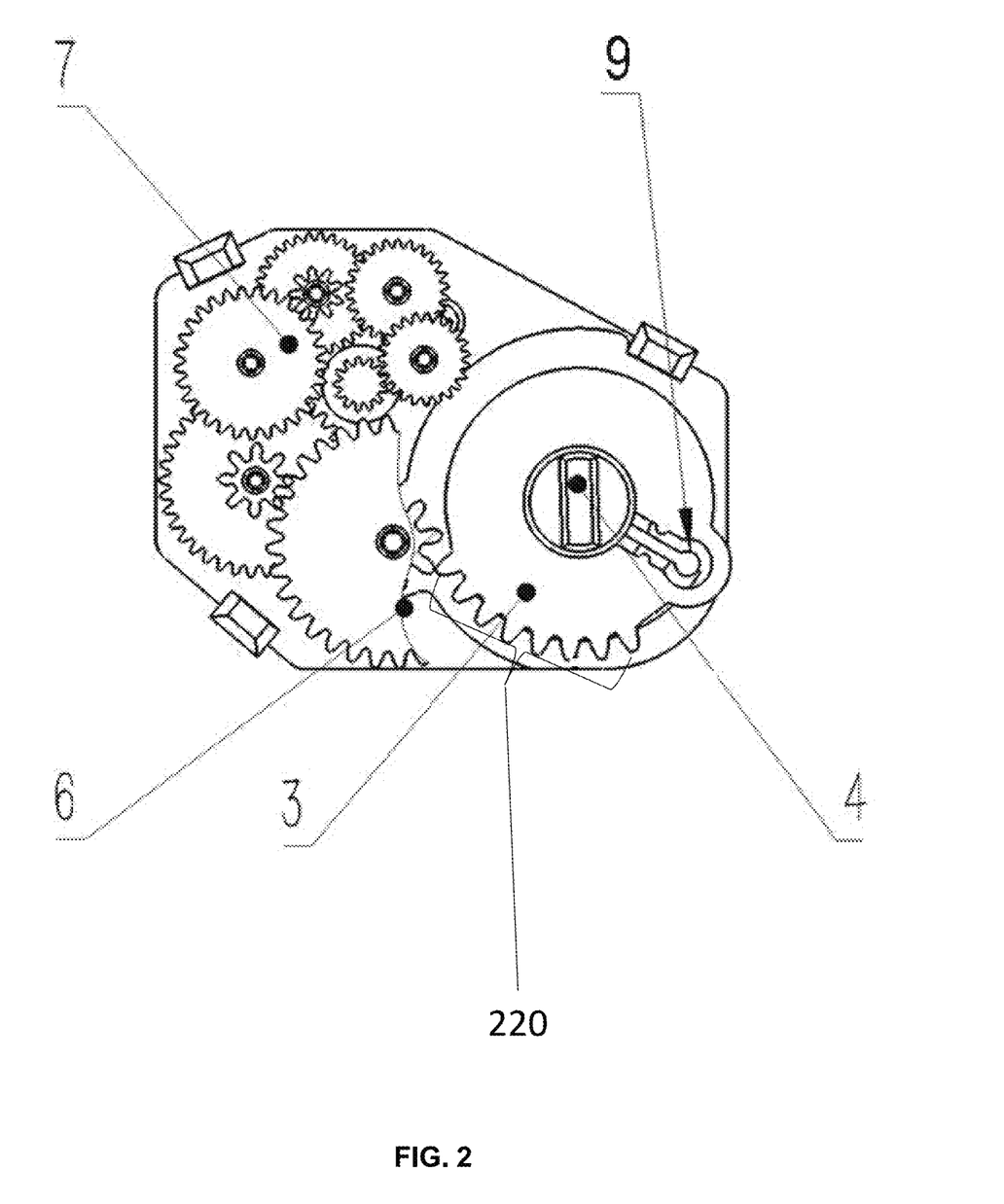
FIG. 2 is a top view of a valve controller according to some embodiments of the present disclosure.

FIG. 2 is a top view of a valve controller according to some embodiments of the present disclosure.

In some embodiments, as shown in FIG. 2, the drive gear 3 is coaxial with the spindle 4, and the spindle 4 is rotatably connected to the drive gear 3 through a shaft hole of the drive gear 3. The spindle 4 and the drive gear 3 are separately provided with a rotation constraint body, which is configured to transmit torque between the spindle 4 and the drive gear 3. In some embodiments, the drive gear 3 transmits the torque to the spindle 4 by mutual extrusion of the rotation constraint bodies.

The rotation constraint body may be a component that allow transmission of the torque between the spindle 4 and the drive gear 3. In some embodiments, the rotation constraint body on the spindle 4 and the drive gear 3 may be provided through a key or a tab, and the rotation constraint bodies arranged on the spindle 4 and the drive gear 3 may cooperate with each other to achieve a purpose of transmitting the torque.

In some embodiments, the transmission of the torque between the spindle 4 and the drive gear 3 may not be limited to an arrangement of the rotation constraint body. In some embodiments, a complete gear that is coaxial with the incomplete gear may be arranged on the drive gear 3 that is an incomplete gear and rotates synchronously with the drive gear 3. The complete gear may drive the spindle 4 to rotate by engaging with the teeth of the spindle 4. The complete gear may be disengaged from the tooth engagement of the spindle 4 by generating a translation between the drive gear 3 and the spindle 4 in a radial direction of the spindle 4, thereby achieving a relative rotation. The complete gear may be disengaged from the tooth engagement of the spindle 4 by generating relative motion relative to the spindle 4 in an axial direction of the spindle 4 through the drive gear 3 to achieve the relative rotation.

In some embodiments, a relative rotation between the spindle 4 and the drive gear 3 may be achieved through a rotation clearance, for example, the spindle 4 and the drive gear 3 may have a rotation clearance that allows the relative rotation of the spindle 4 and the drive gear 3 to occur. In some embodiments, when the relative rotation reaches a stop position, the spindle 4 may rotate by using mechanical energy already available on the drive gear 3 to act on the spindle 4. In some embodiments, at a stop position, the teeth on the drive gear 3 do not necessarily complete the engagement reset with the driving component. In some embodiments, at a stop position, the drive gear 3 is already engaged with the driving component, thus the torque generated by the gear transmission is used to act directly on the spindle 4 to complete the drive of the valve core.

In some embodiments, the drive gear 3 is capable of rotating independently relative to the spindle 4, thereby achieving the relative rotation. In some embodiments, the relative rotation is achieved through a rotation clearance, and the rotation clearance may use a scheme of a key matching with a key groove or a scheme of tab matching with tab, etc. It may be understood that the rotation clearance may correspond to an idle travel of the drive gear 3 in a rotation path (e.g., before the key contacting the key groove, before the tab contacting a corresponding tab).

Figure 3:
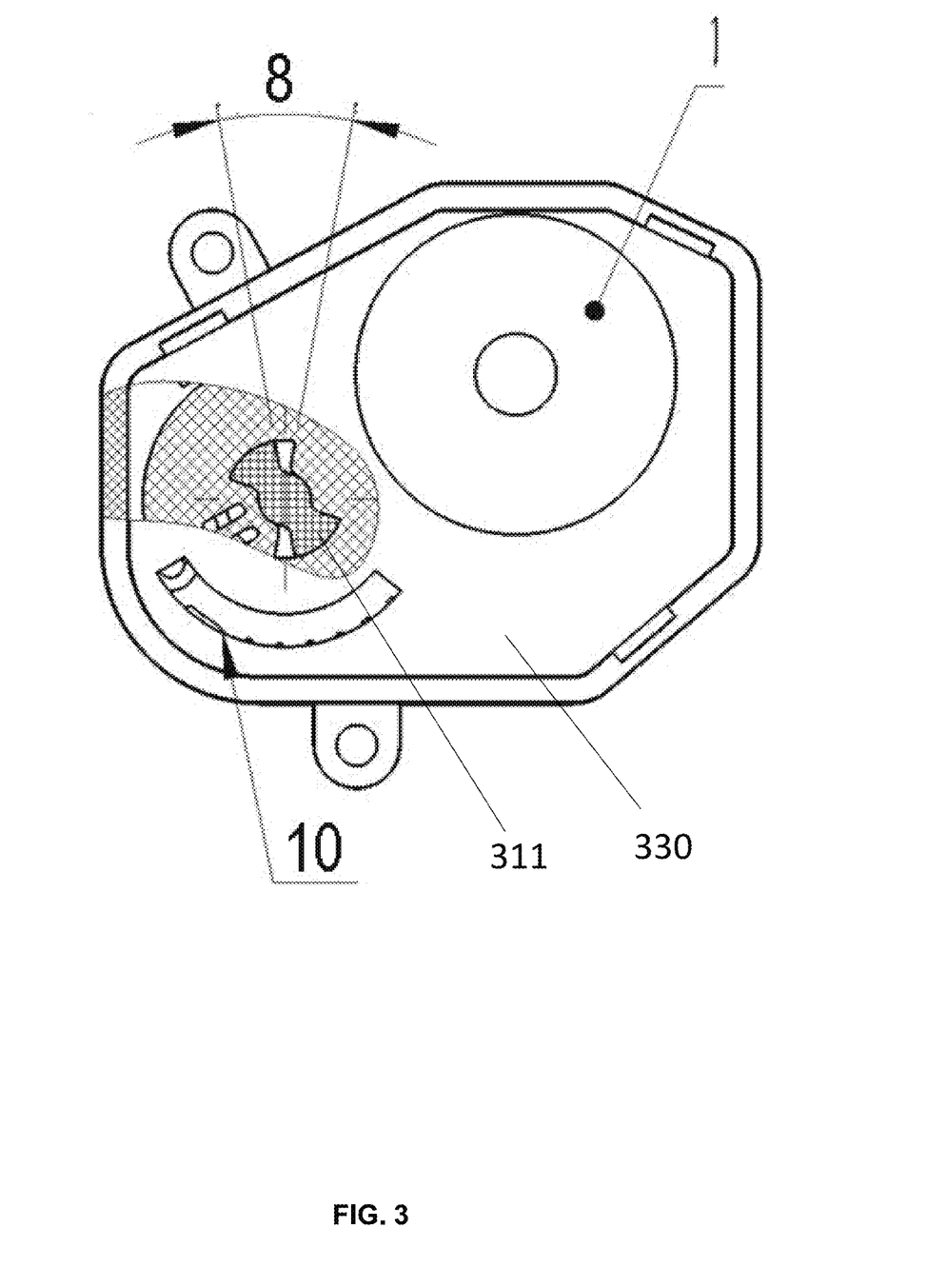
FIG. 3 is a bottom view of a valve controller according to some embodiments of the present disclosure.

FIG. 3 is a bottom view of a valve controller according to some embodiments of the present disclosure. In the bottom view of FIG. 3, a gearbox section is a partial section view.

In some embodiments, the rotation constraint body on one of the spindle 4 and the drive gear 3 is a key and the rotation constraint body on other one of the spindle 4 and the drive gear 3 is a key groove. A width of the key groove is greater than a width of the key. A depth of the key groove is less than a length of the shaft hole. A bottom surface of the key groove is an arcual surface whose axis is coaxial with the axis of the spindle 4 and an end surface of a free end of the key is an arcual surface whose axis is coaxial with the axis of the spindle 4. The bottom surface of the key groove abuts the end surface.

In some embodiments, a difference between a width of the key groove and a width of the key is a width of the rotation clearance.

In some embodiments, there are a plurality of keys and a plurality of key grooves. A count of the keys and a count of the key grooves are equal. The keys and the key grooves form a plurality of key engagement working groups one by one. The plurality of key engagement working groups are evenly arranged in a circular shape relative to the axis of the spindle 4. The plurality of key engagement working groups are synchronously engaged or disengaged during a relative rotation of the spindle and the drive gear.

In some embodiments, the key is disposed on the spindle 4 and the key groove is disposed on the drive gear 3. A depth of the key groove is smaller than a length of the shaft hole. Exemplarily, a drive gear 3 corresponding to the ball valve is generally a plastic member, and a depth of the key groove may be set to be less than the length of the shaft hole due to a bias grinding of the shaft hole on the drive gear 3, which may lead to a poor engagement accuracy of the drive gear 3 with the driving component. In some embodiments, in an axial direction of the shaft hole, the shaft hole may be divided into at least two sections according to an impact size of the key groove, one of which is a cylindrical hole section capable of completely matching the spindle 4, and other of which is a special-shaped hole section used to connect the key groove. In some embodiments, a constraint from the cylindrical hole section to the spindle 4 is able to ensure a mating accuracy of the spindle 4 and the drive gear 3, which ensures an accuracy of the tooth engagement of the drive gear 3 and the driving component.

In some embodiments, the spindle 4 may be provided with a special-shaped shaft, and the shaft hole on the drive gear 3 matching the spindle 4 may be a special-shaped hole. In some embodiments, the special-shaped shaft and the special-shaped hole may respectively include mating sections with different cross-sectional forms, and the drive gear 3 is enabled to generate the relative rotation relative to the spindle 4 by obtaining a rotation clearance on the mating sections. However, it may be understood that a specific idea of the embodiment is still to drive the spindle 4 by subjecting the key to shear stress, which is equivalent to the above key transmission.

In some embodiments, the groove bottom surface of the key groove may be an arcual surface, and the axis of the arcual surface may be coaxial with the axis of the spindle 4, and the end surface of the free end of the key may be an arcual surface, and the axis of the arcual surface may be coaxial with the axis of the spindle 4, thereby enabling the end surface of the free end of the key to fit the groove bottom surface of the key groove and further solving a problem of bias grinding. In some embodiments, the groove bottom surface abuts the end surface.

In some embodiments, in order to avoid a problem of bias grinding caused by a deformation generated by bending torque when the spindle 4 is subjected to force, there are a plurality of keys and a plurality of key grooves, a count of the keys and a count of the key grooves are equal, the keys and the key grooves form a plurality of key engagement working groups one by one, the plurality of key engagement working groups are evenly arranged in a circular shape relative to the axis of the spindle 4, and the plurality of key engagement working groups are synchronously engaged or disengaged during a relative rotation of the spindle 4 and the drive gear 3. In some embodiments, the key engagement work groups are evenly arranged in a circular shape and the key engagement work groups are synchronously engaged or disengaged, so that the bending deformation forces generated by the key engagement work groups on the spindle 4 may be balanced and the bending of the spindle 4 under the action of the drive gear 3 may be avoided, resulting in generation of the bias grinding.

In some embodiments, the key mating relationship may be arranged all within a range of both ends of the drive gear 3, thereby making the key mating scheme more conducive to a small size design of the transmission member relative to the tab scheme.

In some embodiments, a technical scheme that is different from the key mating scheme and easier to machine may be adopted, the rotation constraint body of the spindle 4 is a tab disposed on a side of the spindle 4 and a count of the tabs is one or two. When a count of the tabs of the spindle 4 is two, the two tabs are located at a same axial position of the spindle 4 and the two tabs are spaced in a circumferential direction of the spindle 4. When a count of the tabs of the spindle 4 is two, the rotation constraint body of the drive gear is the tab disposed on an end surface of the drive gear and the tab of the drive gear contacts the tabs of the spindle 4 during a relative rotation of the spindle 4 and the drive gear. When a count of the tabs of the spindle 4 is one, the rotation constraint body of the drive gear 3 is the two tabs disposed on the end surface of the drive gear 3 and the tab of the spindle 4 contacts the tabs of the drive gear 3 during the relative rotation of the spindle 4 and the drive gear 3.

In some embodiments, one of the drive gear 3 and the spindle 4 has two tabs, and on one side where the two tabs are close to each other, a circumferential angle of the spindle 4 associated with a relative position of the two tabs and a distance between the left and right sides of the other tab determines a size of the rotation clearance. Exemplarily, the stop position may be considered to be reached when the drive gear 3 rotates relative to the spindle 4 until the tabs on the drive gear 3 and contacts the tabs on the spindle 4.

In some embodiments, the drive gear 3 is coaxial with the spindle 4 and the spindle is in clearance fit with the drive gear through the shaft hole of the drive gear. In some embodiments, the mating method may match existing technical scheme of conventional incomplete gear design and incomplete gear drive design.

In some embodiments, an elastic member is also disposed between the spindle 4 and the drive gear 3. The elastic member accumulates energy during rotation of the drive gear 3, and the elastic member is configured to subsequently make the drive gear to realize the tooth engagement reset. In some embodiments, an arrangement of the elastic member is able to make the structural design of the valve component simpler and smaller in size.

In some embodiments, a variation in deformation of the elastic member (as the drive gear 3 rotates, it is necessary for the elastic member to deform to a certain extent to be able to drive the spindle 4 to rotate) is configured to make the drive gear 3 rotate independently relative to the spindle 4 in an early stage and both the drive gear 3 and the spindle 4 rotate in a later stage. Compared to independent rotation, an arrangement of the elastic member makes the drive gear 3 rotate with a load, which may be adaptively selected according to a specific application scenario (such as needing to consider a fluid flow area on the valve when the valve is on-state), and a specific used structural form.

In some embodiments, the drive gear 3 may transmit the torque to the spindle 4 through the elastic member, the elastic member deforms elastically, and the spindle 4 achieves the relative rotation with the drive gear 3. In some embodiments, the relative rotation of the drive gear 3 and the spindle 4 may be related to a size of deformation of the elastic member. In some embodiments, when the tooth engagement reset is need to be performed on the drive gear 3, the force driving the drive gear 3 to rotate includes the force of the drive gear 3 itself and the elastic force of the elastic member, therefore, it can reduce a rotation resistance of the drive gear 3 compared to the spindle 4 acting directly and rigidly on the drive gear 3.

In some embodiments, the drive gear 3 may transmit the torque to the spindle 4 through the elastic member. Exemplarily, the drive gear 3 has a feature of rotating with a load, and such a way of transmitting the torque may make a power variation of a motor 1 more smoothly, which is conducive for a service life of the motor 1.

In some embodiments, the elastic member may be a torsion spring sleeved on the spindle 4, and one end of the torsion spring is fixedly connected to the spindle 4, and the other end of the torsion spring is fixedly connected to the drive gear 3.

In some embodiments, a conventional action of the valve is to realize on-off of the valve core by a forward and reverse rotation of the spindle 4. A maximum angle of single rotation of the drive gear 3 during a whole working process may reach the effective engagement angle of the drive gear 3. In order to make the drive gear 3 drive the spindle 4 to rotate, the elastic member may deform continuously and incrementally during the rotation of the drive gear 3, which leads to higher requirements for a maximum power of the motor 1 because of an excessive accumulation of elastic performance of the elastic member, thereby increasing a fluctuation range of an output power of the motor 1. Because of presence of the elastic member, a contact force between the driving component (the driving gear) and the drive gear 3 during the slippage leads to an increased wear of the driving component and the drive gear 3. Therefore, for the elastic member such as the torsion spring and an elastic rod, which stores elastic potential energy by misplacement of positions of both ends, it is not advisable to arrange them as that one end is directly connected to the spindle 4 and the other end is directly connected to the drive gear 3. It may be designed that the elastic member is in a free state when the teeth in the middle of the drive gear 3 are engaged with the driving gear within the effective engagement angle of the drive gear 3. When the drive gear 3 is further rotated, the elastic member deforms elastically to obtain a deformation amount capable of driving the spindle 4 to rotate after the deformation reaches a certain extent, and the spindle 4 is further driven to rotate under the action of the drive gear 3. Such design may increase the power of the motor 1 to some extent, but may be used as a power component for achieving tooth engagement reset of the drive gear 3 and the driving component. In some embodiments, the elastic member may be fixed on one of the spindle 4 and the drive gear 3, only when the both relatively rotate at a certain angle and the other of the spindle 4 and the drive gear 3 contacts the elastic member, the elastic member may play a substantial function of transmitting the torque through the way of the elastic member toggling the other or the other toggling the elastic member. Such arrangement may reduce the size of the elastic member, which is especially suitable for an application scenario that requires rapid on-off of the valve core.

In some embodiments, the two rotation directions of the drive gear 3 may be defined as a forward direction and a reverse direction, respectively, and elastic members may be separately arranged for the forward and reverse directions. In one specific embodiment, the elastic member may include a first elastic member and a second elastic member, the first elastic member drives the spindle 4 to rotate in the forward direction only under the action of the drive gear 3, and the second elastic member drives the spindle 4 to rotate in a reverse direction only under the action of the drive gear 3. Such arrangement may improve a force situation of the elastic member.

Figure 4:
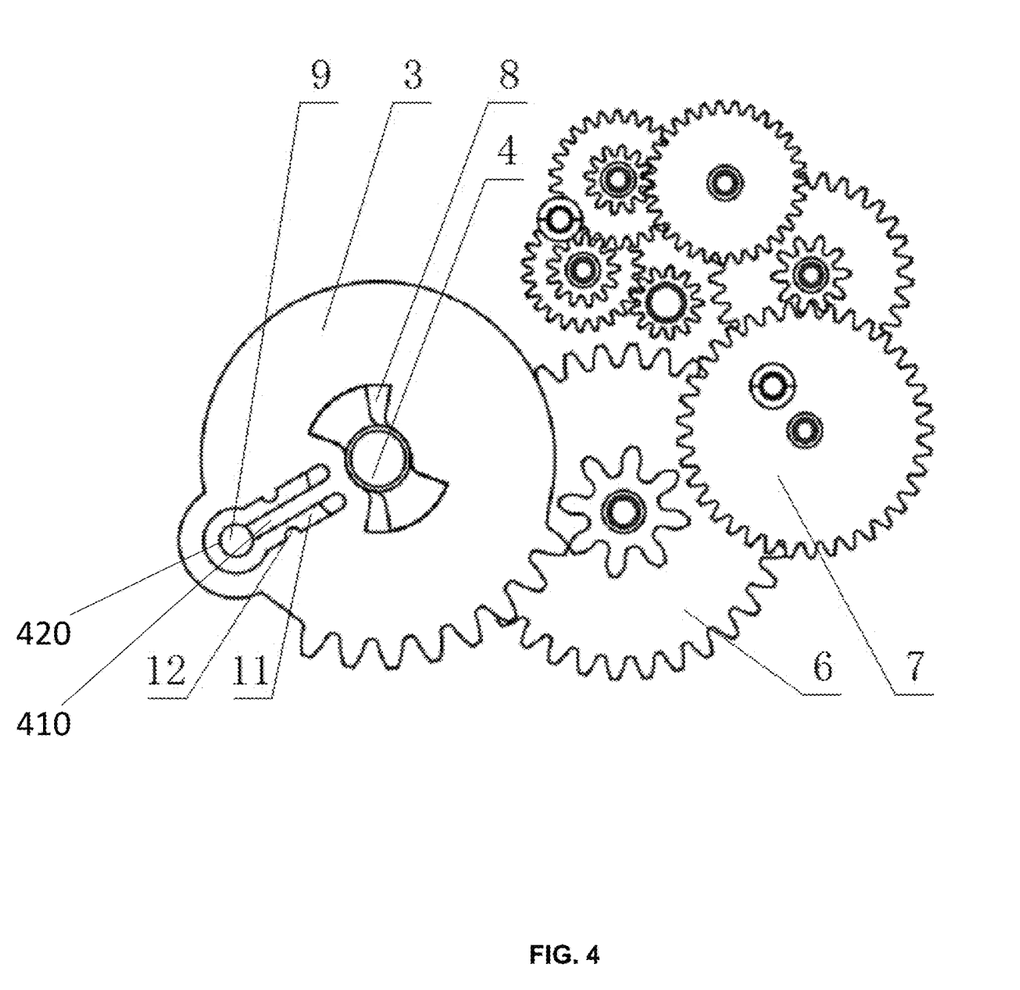
FIG. 4 is a top view of a valve controller according to some embodiments of the present disclosure.

FIG. 4 is a top view of a valve controller according to some embodiments of the present disclosure. The top view omits the box portion of the gearbox.

In some embodiments, the valve controller includes a driving component and a valve core transmission member 100. The driving component drives the drive gear 3 to rotate by engaging with the tooth of the drive gear 3. The driving component drives the spindle 4 to rotate through the drive gear 3. The rotation of the spindle 4 includes a forward rotation and a reverse rotation.

The driving component may refer to a component that generates driving force. In some embodiments, the driving component may drive the drive gear 3 to rotate so as to drive the spindle 4 to rotate. Exemplarily, the driving component may include a gear group, a motor, etc.

In some embodiments, the drive gear 3 is in a relatively rotatable mating state with the spindle 4 during a process of a tooth engagement reset after the tooth engagement is disengaged between the driving component and the drive gear, and the driving force required for resetting the drive gear 3 is minimized through idling the drive gear 3 throughout the process of tooth engagement reset of the drive gear 3.

In some embodiments, the drive gear 3 is an incomplete gear, which can achieve a purpose of avoiding blocked rotation. The blocked rotation may mean that when the valve core continues to rotate under the action of the motor 1 and rotates in place, it causes the spindle 4 connected to the valve core not to continue to rotate, and further causes the motor 1 to be forced to stop rotating because of the interaction with the spindle 4, causing excessive operating current and high power consumption of the motor 1 and reducing the service life of the motor 1. The drive gear 3 may disposed to be able to rotate relative to the spindle 4 around the axis of the spindle 4 to prevent the blocked rotation, thereby improving engagement reliability, reducing a power input required to the tooth engagement reset of the drive gear 3, and reducing a volume of the structure of the valve component.

In some embodiments, the drive gear 3 may engage with the teeth of the driving gear (of the driving component) by employing the incomplete gear (also known as a sector gear) as the drive gear 3, and the drive gear 3 may be considered as a driven gear relative to the driving gear. For example, when the driving gear driven by the motor 1 rotates to a state where the motor 1 is disengaged form the tooth engagement of the drive gear 3, it is avoided that the motor 1 is not forced to stop rotation due to the valve core rotating in place because the drive gear 3 no longer affects the rotation of the driving gear. Exemplarily, since the drive gear 3 is capable of rotating relative to the spindle 4 during tooth engagement reset, the drive gear 3 may rotate at a greater angle relative to the spindle 4, avoiding the rotation resistance of the valve core affecting or excessively affecting the tooth engagement reset of drive gear 3 due to the linkage between the valve core and the spindle 4. In some embodiments, the incomplete gear may be disposed to achieve the disengagement of the incomplete gear from the driving gear without affecting the rotation of the driving gear, avoiding the blocked rotation and reducing the volume of the structure.

In some embodiments, the drive gear 3 has a plurality of teeth 220 to optimize a wear problem of the teeth on an upper end of the drive gear 3.

In some embodiments, the mating relationship between the driving component and the drive gear satisfies that: during a process of the tooth engagement reset after the tooth engagement is disengaged under any rotation direction of the drive gear 3, the drive gear 3 is in a relatively rotatable mating state with the spindle 4 when the driving component engages and resets with a first tooth on the drive gear 3. That is, when the first tooth completes the tooth engagement with the driving component, then the drive gear 3 is restored to a state where the drive gear 3 is capable of providing a driving force for the spindle 4.

In some embodiments, a corresponding purpose may be achieved according to a specific size of the teeth on the drive gear 3 and a design of the size of the rotation clearance. For example, the rotation clearance may be greater than a tooth thickness of the teeth on the drive gear 3 (the tooth thickness of a gear tooth of a standard basic rack) in a circumferential direction of the drive gear 3. Further, considering a re-engaging efficiency, the rotation clearance may be further relaxed to be equal to the tooth thickness at a top position of the teeth (a tooth thickness at a tip circle position).

In some embodiments, as shown in FIG. 4, the driving component may include a reduction gear group 7, and the drive gear 3 is configured to engage with a final gear 6 of the reduction gear group 7. Such arrangement may reduce a size of power source such as the motor 1 on the controller and reduce dependence on a matching power source. In some embodiments, a scheme based on a reduction action gearbox of the driving component 3 may also be provided. In some embodiments, the final gear 6 may be the driving gear of other embodiments of the present disclosure.

Figure 5:
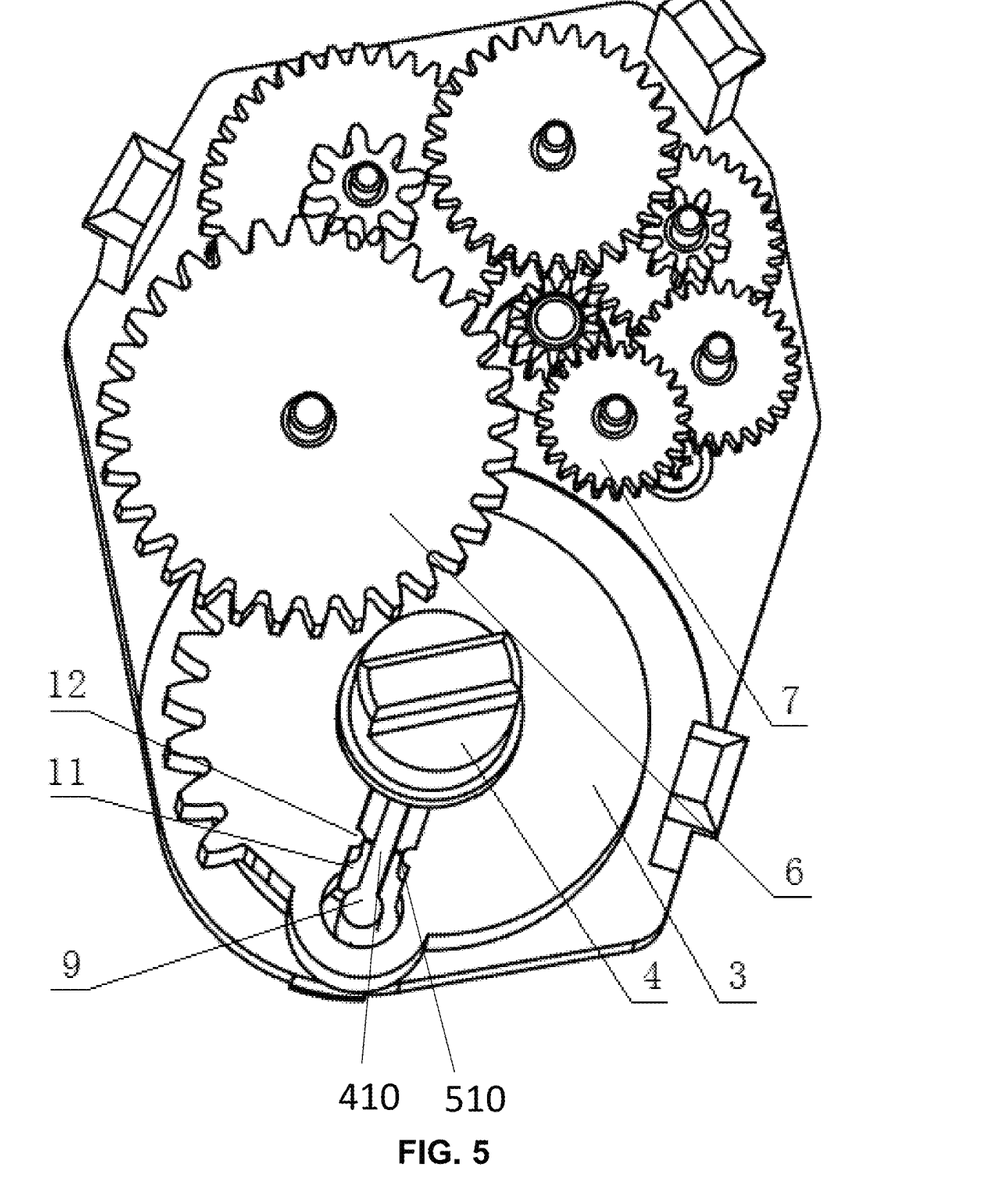
FIG. 5 is a schematic diagram illustrating a structure of a valve controller according to some embodiments of the present disclosure.

FIG. 5 is a schematic diagram illustrating a structure of a valve controller according to some embodiments of the present disclosure, which is a three-dimensional structural diagram.

In some embodiments, as shown in FIG. 5, the valve controller also includes an elastic limiting member configured to achieve a tooth engagement reset between the drive gear 3 and teeth of the driving component.

In some embodiments, the elastic limiting member is able to limit the drive gear 3 to rotate within an angular range of the effective engagement angle, e.g., employing a complete gear as the drive gear 3 may also achieve a similar transmission effect as employing an incomplete gear as the drive gear 3.

In some embodiments, the elastic limiting member includes an elastic limiting body 9. The elastic limiting body 9 accumulates energy during the rotation of the drive gear 3, and the elastic limiting body 9 drives the drive gear 3 to rotate through rebounding to realize the tooth engagement reset during a process of the tooth engagement reset. In some embodiments, a re-engagement between the drive gear 3 and driving component may be realized by employing a separate drive mechanism.

In some embodiments, the elastic limiting body 9 refers to at least one of a spring, an elastic rope, or an elastic rod. For the elastic rope, one end of the elastic rope is connected to the drive gear 3, the other end of the elastic rope is connected to a housing of the driving component, and the energy is accumulated by the elastic rope being stretched. For both the spring and the elastic rod, one end of the spring or the elastic rod is restrained to one of the drive gear 3 and the housing of the driving component, the other end of the spring or the elastic rod is restrained to the other of the drive gear 3 and the housing of the driving component, and the energy is accumulated by elastic deformation of the spring or the elastic rod.

In some embodiments, the elastic rope may be applied based on the gearbox, one end of the elastic rope is fixed to the drive gear 3 and one end of the elastic rope is fixed to the gearbox seat 2 of the gearbox, for example, the end cap of the gearbox. In other embodiments, the spring and the elastic rod may be applied based on the gearbox, the one end of the spring and the elastic rod interacts with the drive gear 3 and the other end of the spring and the elastic rod interacts with the housing of the gearbox. Exemplarily, the one end of the spring and the elastic rod may act on the end cap of the gearbox. Further, the one end of the spring and the elastic rod may be directly fixed and connected to the gearbox, and the force are transmitted by mutual extrusion of contact surfaces; and the other end of the spring and the elastic rod may be directly fixed and connected to the drive gear 3, and the forces are transmitted by mutual extrusion of the contact surfaces.

In some embodiments, accumulated energy of the elastic limiting body 9 may be configured to achieve a purpose of re-engaging the drive gear 3 by arranging the elastic limiting body 9, so as to optimize a structural complexity of the controller, a complexity of action control of the controller, and improve a reliability of the controller.

In some embodiments, the elastic limiting member may include an elastic rod with a bent rod. Rod sections at two bent ends of the elastic rod include a first rod section 410 and a second rod section 420, one end of the first rod section 410 is fixed to the drive gear 3, two ends of the first rod section 410 are located at different positions of the drive gear 3 in a radial direction of the drive gear 3. The other end of the first rod section 410 is connected to the second rod section 420, and a free end of the second rod section 420 bulges outwardly relative to the end surface of the drive gear 3. As shown in FIG. 3, an end plate 330 of the housing of the driving component is further provided with a rotation limiting slot 10 and the second rod section 420 is partially embedded in the rotation limiting slot 10.

In some embodiments, the elastic rod may be used as a pendulum rod that rotates synchronously with the drive gear 3, and when the rod section of the second rod section 420 embedded in the rotation limiting slot 10 as the pendulum rod is contact with an end surface of the rotation limiting slot 10, the accumulation of energy of the elastic rod is realized under further rotation of the drive gear 3. Exemplarily, for the specific rotation direction of the drive gear 3, the accumulation of the energy of the elastic rod is achieved under the further rotation of the drive gear 3 after the rod section of the second rod section 420 embedded in the rotation limiting slot 10 contacts an end of a corresponding side of the rotation limiting slot 10.

In some embodiments, the drive gear 3 also includes a slot 11 extending in a radial direction along the drive gear 3. In some embodiments, the first rod section 410 is fixed to one end of the slot 11 close to the spindle 1. When the first rod section 410 is in a free state, an extension direction of the first rod section 410 is the same as that of the slot 11, and both sides of the first rod section 410 and side walls 510 of the slot 11 have a swing clearance. In some embodiments, the elastic member may be arranged as a cantilever rod located in space occupied by the drive gear 3 to optimize a space occupation, which facilitates a miniaturization design of the valve controller.

In some embodiments, further considering machining quality and avoiding interchangeability problems between controllers due to an installation of the cantilever rod, the elastic rod may be arranged to be of one-piece design with the drive gear 3. For example, the one-piece structure may be produced through one-time injection molding, and then a clearance processing is performed on the one-piece structure to obtain the elastic rod as a cantilever rod. In some embodiments, considering an angle of relative rotation, a corresponding width of clearance may be set; and considering the material of the drive gear 3, a suitable length of the first rod section 410 may be selected to meet that deformation generated by the elastic rod within a required relative rotation range is an elastic deformation.

In some embodiments, as shown in FIG. 5, the side walls 510 of the both sides of the slot 12 have a bump 12 located between the two ends of the first rod section 410. when the first rod section 410 is in the free state, there is a clearance between the side wall of each side of the first rod section 410 and the free end of the bump 12 of the side.

In some embodiments, a middle/continuous section of the first rod section 410 contacts the end of the bump 12, which may realize a purpose of optimizing the force on a connecting end of the first rod section 410. Exemplarily, a shape of the end surface of the free end of the bump 12 may be a smooth transition arcual surface to avoid severe crush damage on the bump 12 and the first rod section 410.

In some embodiments, as shown in FIG. 5, the valve may include a valve core that adjusts the on-state of the valve by being rotated, and a valve controller. The valve core are fixed to the spindle 4, and the spindle 4 is used as a stem of the valve core.

teeth In some embodiments, the valve control method may be used for the following valve. A valve may realize an on-off control of the valve by rotating the valve core; the valve core is driven to work by the drive gear 3 driving the stem to rotate; and the drive gear 3 is capable of relatively rotating around an axis of the stem relative to the stem.

In some embodiments, the valve control method includes: before the stem performs a reversing rotation, the drive gear 3 performs relative rotation around the axis of the stem relative to the stem; by the relative rotation, the drive gear 3 provides torque to the stem to drive the valve core to rotate when a tooth engagement reset between the drive gear 3 and the teeth of the driving component configured to drive the drive gear 3 to rotate is realized. Based on a usage of driving a valve that prevents blocked rotation, the method may facilitate re-engagement of teeth of the drive gear, improve a reliability of engagement, reduce the structural volume and performance requirements of the corresponding hardware portion, and reduce an overall structural complexity of the valve.

The basic concepts have been described above, and it is clear that the above detailed disclosure is intended as an example only and does not constitute a limitation of the present disclosure to those skilled in the art. Although not expressly stated herein, there are various modifications, improvements and amendments that may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe embodiments of the disclosure. For example, "an embodiment", "the embodiment", and/or "some embodiments" mean a feature, structure, or characteristic associated with at least one embodiment of the present disclosure. Therefore, it should be emphasized and noted that "an embodiment" or "the embodiment" or "an alternative embodiment" mentioned twice or more in different places in the present disclosure does not necessarily refer to the same embodiment. In addition, certain features, structures or characteristics of one or more embodiments of the present disclosure may be suitably combined.

In addition, unless expressly stated in the claims, the order where the elements and sequences are treated, the use of numeric letters, or the use of other names in the present disclosure are not intended to qualify the order of the processes and methods of the present disclosure. Although some embodiments currently considered useful are discussed in the above disclosure by way of various examples, it should be understood that such details serve only illustrative purposes and that the additional claims are not limited to the disclosed embodiments; rather, the claims are intended to cover all modifications and equivalent combinations consistent with the substance and scope of the embodiments of the present disclosure. For example, while the system components described above may be implemented by hardware devices, they may also be implemented by software-only schemes, such as installing the described system on an existing server or mobile device.

Similarly, it should be noted that in order to simplify the presentation of the present disclosure and thereby aid in the understanding of one or more embodiments, the preceding descriptions of embodiments of the present disclosure sometimes group multiple features into one embodiment, accompanying drawings, or description thereof. However, this method of disclosure does not imply that the object of the present disclosure requires more features than those mentioned in the claims. In fact, the features of the embodiments are less than all of the features of the individual embodiments disclosed above.

Some embodiments use numbers describing the count of components, attributes, and it should be understood that such numbers used in the description of embodiments are in some examples qualified by the modifiers "approximately" or "substantially" to qualify. Unless otherwise noted, "approximately" or "substantially" indicates that the figures allow for ±20% variation. Accordingly, in some embodiments, the numerical parameters used in the specification and claims are approximations, which may change depending on the desired characteristics of individual embodiments. In some embodiments, the numerical parameters should take into account the specified count of valid digits and use the general bit retention method. Although the numerical fields and parameters used in some embodiments of the present disclosure to confirm the breadth of their ranges are approximate, in specific embodiments such values are set as precisely as practicable.

Each patent, patent application, patent application disclosure, and other material such as articles, books, specifications, publications, and documents referenced in the present disclosure is hereby incorporated by reference into the present disclosure in its entirety. Except for documents in the application history that are inconsistent with or conflict with the contents of the present disclosure, and except for documents that limit the broadest scope of the claims of the present disclosure (currently or subsequently attached to the present disclosure). It should be noted that in the event of any inconsistency or conflict between the descriptions, definitions, and/or use of terms in the material accompanying the present disclosure and the contents of the present disclosure, the descriptions, definitions, and/or use of terms in the present disclosure shall prevail.

Finally, it should be understood that the embodiments in the present disclosure are used only to illustrate the principles of the embodiments of the present disclosure. Other variations may also fall within the scope of the present disclosure. Thus, as examples and not limitations, alternative configurations of embodiments of the present disclosure may be considered consistent with the teachings of the present disclosure. Accordingly, the embodiments of the present disclosure are not limited to the embodiments explicitly introduced and described in the present disclosure.

What is claimed is:

1. A valve controller, comprising a driving component and a valve core transmission member, wherein
    the valve core transmission member includes a drive gear and a spindle, wherein
        the drive gear has a plurality of teeth, the drive gear is configured to drive the spindle to rotate around a spindle axis, and the drive gear is an incomplete gear with an effective engagement angle;
        the drive gear is capable of rotating around the spindle axis relative to the spindle and has a free rotation angle relative to the spindle; and
        the effective engagement angle of the drive gear is greater than the free rotation angle;
    the driving component drives the drive gear to rotate by engaging with the plurality of teeth of the drive gear;
    the driving component drives the spindle to rotate through the drive gear; wherein a rotation of the spindle includes one of a forward rotation and a reverse rotation; and
    the driving component and the drive gear have a mating relationship satisfying that: during a process of tooth engagement reset after the tooth engagement is disengaged under any rotation direction of the drive gear, the drive gear is in a relatively rotatable mating state with the spindle when the driving component engages and resets with a first tooth on the drive gear.

2. The valve controller of claim 1, wherein the drive gear is in a relatively rotatable mating state with the spindle during a process of tooth engagement reset after the tooth engagement is disengaged between the driving component and the drive gear.

3. The valve controller of claim 1, wherein the driving component includes a reduction gear group and the drive gear is configured to engage with a final gear of the reduction gear group.

4. The valve controller of claim 1, further comprising an elastic limiting component configured to realize the tooth engagement reset between the drive gear and the driving component.

5. The valve controller of claim 4, wherein the elastic limiting component includes an elastic limiting body; and
    the elastic limiting body accumulates energy during a rotation of the drive gear and the elastic limiting body drives the drive gear to rotate through rebounding to realize the tooth engagement reset during a process of the tooth engagement reset.

6. The valve controller of claim 5, wherein the elastic limiting body includes an elastic rod;
    wherein one end of the elastic rod is restrained to one of the drive gear and the housing of the driving component, the other end of the elastic rod is restrained to the other of the drive gear and the housing of the driving component, and the energy is accumulated by elastic deformation of the elastic rod.

7. The valve controller of claim 4, wherein the elastic limiting component includes an elastic rod;
- the elastic rod includes a first rod section and a second rod section, one end of the first rod section is fixed to the drive gear, two ends of the first rod section are located at different positions of the drive gear in a radial direction of the drive gear, the other end of the first rod section is connected to the second rod section, and a free end of the second rod section bulges outwardly relative to an end surface of the drive gear; and
- an end plate of a housing of the driving component is further provided with a rotation limiting slot and the second rod section is partially embedded in the rotation limiting slot.

8. The valve controller of claim 7, wherein the drive gear further includes: a slot extending in a radial direction along the drive gear;
- the first rod section is fixed to one end of the slot close to the spindle;
- when the first rod section is in a free state, a direction of the first rod section is the same as an extension direction of the slot, and both sides of the first rod section and side walls of the slot have a swing clearance.

9. The valve controller of claim 8, wherein the side walls of the both sides of the slot have a bump located between the two ends of the first rod section; and
- when the first rod section is in the free state, a clearance is provided between the side wall of each side of the first rod section and a free end of the bump of the side.

* * * * *